United States Patent
Hyun

(10) Patent No.: US 9,609,855 B2
(45) Date of Patent: Apr. 4, 2017

(54) REEL FRAME FOR FISHING

(71) Applicant: DOYO ENGINEERING CO., LTD., Bucheon (KR)

(72) Inventor: Kwang Ho Hyun, Bucheon (KR)

(73) Assignee: DOYO ENGINEERING CO., LTD., Gyeonggi-Do, Bucheon (KR)

( * ) Notice: Subject to any disclaimer, the term of this patent is extended or adjusted under 35 U.S.C. 154(b) by 0 days.

(21) Appl. No.: 14/918,864

(22) Filed: Oct. 21, 2015

(65) Prior Publication Data

US 2016/0113260 A1    Apr. 28, 2016

(30) Foreign Application Priority Data

Oct. 22, 2014   (KR) ........................ 10-2014-0143444

(51) Int. Cl.
   *A01K 89/01*    (2006.01)
   *A01K 89/015*   (2006.01)
   *A01K 89/0165*  (2006.01)

(52) U.S. Cl.
   CPC ...... *A01K 89/0192* (2015.05); *A01K 89/0165* (2013.01)

(58) Field of Classification Search
   CPC ................ A01K 89/015; A01K 89/016; A01K 89/0192; A01K 89/01921
   See application file for complete search history.

(56) References Cited

U.S. PATENT DOCUMENTS

| | | | | |
|---|---|---|---|---|
| 4,482,106 A | * | 11/1984 | Kovalovsky | A01K 89/015 242/258 |
| 4,715,555 A | * | 12/1987 | McChristian, Jr. | A01K 89/016 242/295 |
| 6,199,782 B1 | * | 3/2001 | Oishi | A01K 89/015 242/290 |
| 9,210,922 B2 | * | 12/2015 | Nakagawa | A01K 89/015 |
| 2007/0181728 A1 | * | 8/2007 | Kawasaki | A01K 89/00 242/310 |
| 2011/0011968 A1 | * | 1/2011 | Ikuta | A01K 89/015 242/307 |
| 2012/0018562 A1 | * | 1/2012 | Takamatsu | A01K 89/015 242/307 |

(Continued)

FOREIGN PATENT DOCUMENTS

| | | |
|---|---|---|
| KR | 100737883 | 7/2007 |
| KR | 1020100056966 | 5/2010 |

(Continued)

*Primary Examiner* — Emmanuel M Marcelo
(74) *Attorney, Agent, or Firm* — Cantor Colburn LLP

(57) ABSTRACT

Provided is a reel frame for fishing that has improved machinability and productivity with a minimized machining cost by reducing the portions that requires milling, but by maximizing the portions that requires lathe processing. The reel frame for fishing includes: a palm-facing first panel; a gear-facing second panel; a spool space between the first and second panel; and a connecting unit maintaining the space and including a first rib connecting the first and second panel to each other and combined with a fishing rod mount, in which the first rib has a body and curved ends at both sides of the body to make a recess between the first and second panels and the first rib, for lathe processing for making inside chamfered portions around inner sides of the first and second panels.

3 Claims, 6 Drawing Sheets

(56) References Cited

U.S. PATENT DOCUMENTS

2013/0161433 A1\* 6/2013 Takechi ............... A01K 89/033
                                                    242/243
2014/0183293 A1\* 7/2014 Nakagawa ........... A01K 89/015
                                                    242/255

FOREIGN PATENT DOCUMENTS

KR      101217156      12/2012
KR      101374235       3/2014

\* cited by examiner

REEL FRAME FOR FISHING

BACKGROUND OF THE INVENTION

Field of the Invention

The present invention relates to a reel frame for fishing that can be more efficiently machined. In detail, the present invention relates to a reel frame for fishing that has improved machinability and productivity with a minimized machining cost by reducing the portions, which requires milling which rotates and feeds a cutting tool and needs a relatively high cost, but by maximizing the portions, which requires lathe processing which rotates a workpiece, feeds a cutting tool, and needs a relatively low cost, that can be gripped well and stably held in a hand by rounding the portions, which user's hands or body comes in contact with, through chamfering, particularly, inside chamfering.

Description of the Related Art

Plastic molds and die casting frames are used for reels such as bait reels for hooking relatively small fishes, but high-strength frames manufactured by cutting a metal ingot (bar-shaped ingot) such as aluminum or an aluminum alloy are used for trolling or jigging reels used for hooking relatively large fishes.

In relation to a fishing reel, particularly, a trolling reel, there is a "Double bearing reel" in Korean Patent No. 10-0737883 (registered on Jul. 4, 2007), which proposes a technology of reducing a burden on a fisherman who uses a harness with a double bearing ring that can be mounted with the harness for connection with a fisherman.

Further, there is a "Drag adjustment device for dual bearing reel" in Korean Patent NO. 10-1217156 (registered on Dec. 24, 2012), which proposes a drag adjustment device for a dual bearing ring that adjusts drag of a lever dragging device for braking a spool that can rotate with respect to the body of a dual bearing reel.

Further, there is a "Drag adjusting device for dual bearing reel" in Korean Patent Application Publication No. 10-2010-0056966 (published on May 28, 2010), which proposes a drag adjusting device, particularly, a drag adjusting device for a dual bearing ring that adjusts drag of a lever dragging device for braking a spool that can rotate with respect to the body of a dual bearing reel.

Further, there is a "casting reel" in Korean Patent No. 10-1374235 (registered on Mar. 7, 2014), which proposes a casting reel that can prevent a fishing line from being cut due to excessive tension in the fishing line because it can adjust drag using a handle and that can prevent tangling of fishing lines due to backlash of a spool.

However, these technologies are all not in associated with cutting characteristics of fishing reel frames.

SUMMARY OF THE INVENTION

Accordingly, the present invention has been made keeping in mind the above problems occurring in the related art, and the present invention is intended to propose a reel frame for fishing that has improved machinability and productivity with a minimized machining cost by reducing the portions, which requires milling which rotates and feeds a cutting tool and needs a relatively high cost, but by maximizing the portions, which requires lathe processing which rotates a workpiece, feeds a cutting tool, and needs a relatively low cost, that can be rounded at the portions, which user's hands or body comes in contact with, through chamfering, particularly, inside chamfering.

Another object of the present invention is to provide a reel frame for fishing in which, when a connecting unit for maintaining a spool space between a palm-facing first panel and a gear-facing second panel includes first rib for coupling a fishing rod mount and a second or a third rib for reinforcement, the portions that a human body comes in contact with are rounded by lathe processing that rotates a metal ingot such as aluminum and feeds a cutting tool, in which the first to third ribs are configured to have a body and curved ends for coupling the first and second panel at both ends of the body in order to perform lathe processing for making machined corners of the first and second panels, which are the main portions to be machined in lathe processing, that is, inside chamfered portions, which are difficult to make relative to outside chamfered portions and brought in contact with the space; recesses are formed between the curved ends and the first and second panels, and a cutting tool rotated for lathe processing can approach the inside chamfered portions of the first and second panels of the metal ingot due to the recesses, so the portions chamfered by lathe processing are maximized.

Another object of the present invention is to provide a reel frame for fishing that allows a user to easily hold a reel frame and do various types of work by making a first panel smaller in area than a second panel when being seen from a side.

In order to achieve the above object, according to one aspect of the present invention, there is provided a reel frame for fishing including: a palm-facing first panel; a gear-facing second panel; a spool space between the first and second panel; and a connecting unit maintaining the space and including a first rib connecting the first and second panel to each other and combined with a fishing rod mount, in which the first rib has a body and curved ends at both sides of the body to make a recess between the first and second panels and the first rib, for lathe processing for making inside chamfered portions around inner sides of the first and second panels.

Further, in the reel frame, the connecting unit may further include a second rib, or second and third rib for reinforcement spaced from the first rib and having curved ends for making the body and the recesses at both ends of the body, the first panel may be smaller in area than the second panel when seen from a side, and the first rib has a recess for keeping a fishing rod mount.

According to the reel frame for fishing that has improved machinability of the preset invention, when a connecting unit for maintaining a spool space between a palm-facing first panel and a gear-facing second panel includes first rib for coupling a fishing rod mount and a second or a third rib for reinforcement, the portions that a human body comes in contact with are rounded by lathe processing that rotates a metal ingot such as aluminum and feeds a cutting tool, in which the first to third ribs are configured to have a body and curved ends for coupling the first and second panel at both ends of the body in order to perform lathe processing for making machined corners of the first and second panels, which are the main portions to be machined in lathe processing, that is, inside chamfered portions, which are difficult to make relative to outside chamfered portions and brought in contact with the space; recesses are formed between the curved ends and the first and second panels, and a cutting tool rotated for lathe processing can approach the inside chamfered portions of the first and second panels of the metal ingot due to the recesses, so the portions chamfered by lathe processing are maximized. Further, a user can easily hold a reel frame and do various types of work by making a first panel smaller in area than a second panel when being seen from a side. Accordingly, by reducing the portions, which requires milling which rotates and feeds a cutting tool and needs a relatively high cost, but by maximizing the portions, which requires lathe processing which rotates a workpiece, feeds a cutting tool, and needs a relatively low cost, it is possible to round the portions, which user's hands or body comes in contact with, through chamfering, particularly, inside chamfering.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
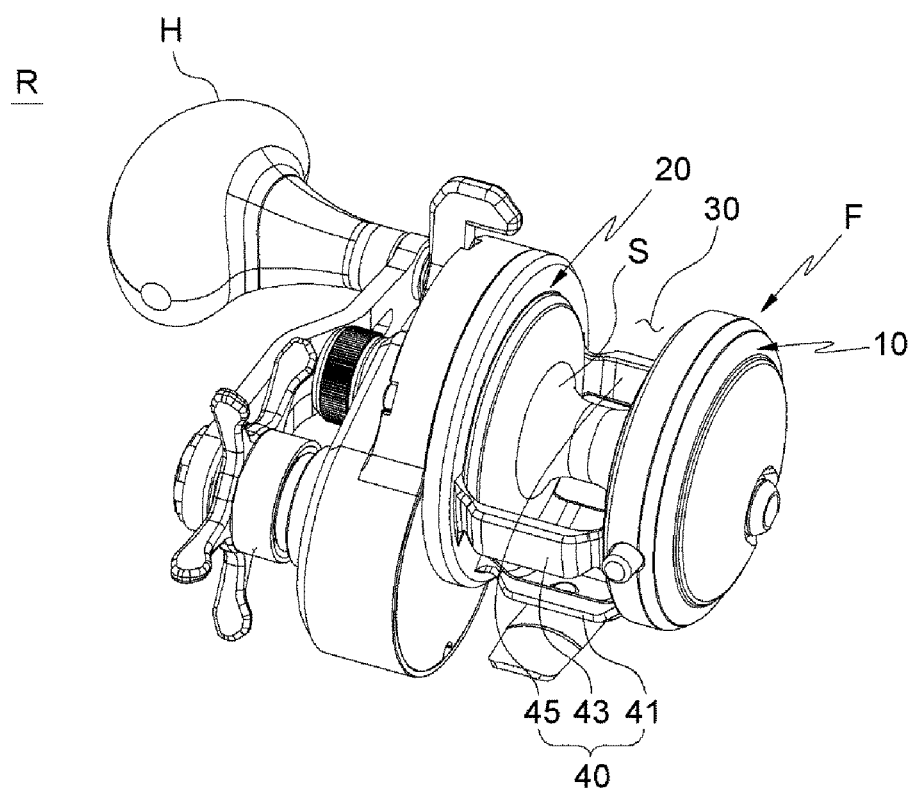
FIGS. 1 and 2 are perspective views of a fishing reel according to the present invention.
Figure 2:
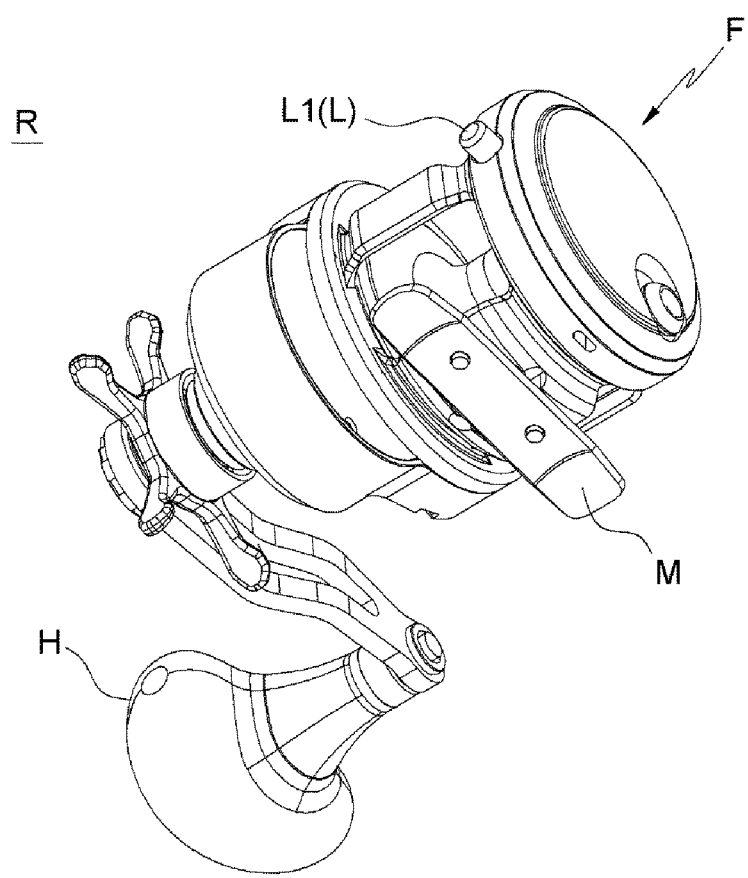
Figure 3:
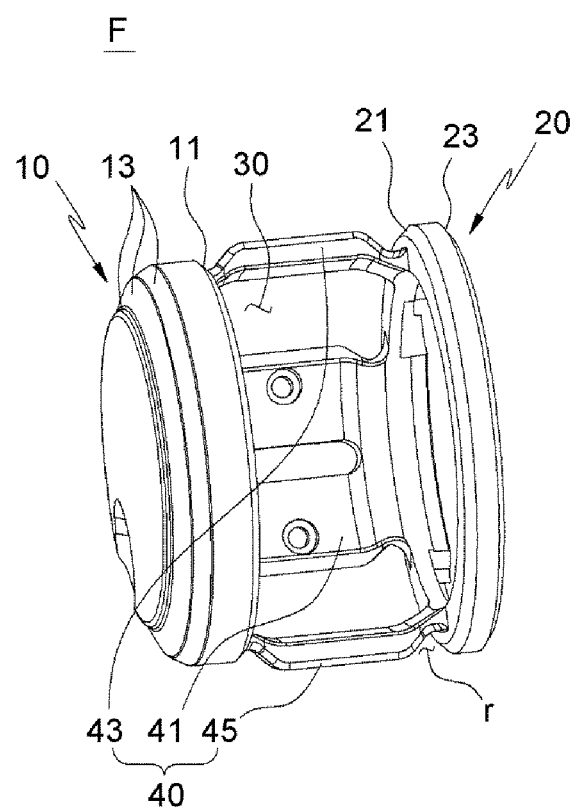
FIGS. 3 to 6 are views showing a reel frame for fishing according to the present invention.
Figure 3:

The present invention will be described hereafter in detail with reference to the accompanying drawings.

The present invention may be modified in various ways and implemented by various exemplary embodiments, so that aspects (or exemplary embodiments) are shown in the drawings and will be described in detail. However, it is to be understood that the present invention is not limited to the specific exemplary embodiments, but includes all modifications, equivalents, and substitutions included in the spirit and the scope of the present invention.

Reference numerals in the drawings, particularly, reference numerals that are the same in tens and units, or tens, units, and letters indicate the components having the same or similar functions, and if not specifically stated, the components indicated by those reference numerals can be considered as components following this standard.

Components in the drawings may be shown excessively large (or thick) or small (or thin) or simply shown in consideration of the convenience of understanding, but it should not be construed as limiting the protective range of the present invention.

Terminologies used herein are for explaining specific aspects (or embodiments) and are not intended to limit the present invention. Singular forms are intended to include plural forms unless the context clearly indicates otherwise. It will be further understood that the terms "comprises" or have used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Well-known functions and configurations may not be described, if it is determined that the description of them may unnecessarily make the spirit of the present invention unclear in this specification.

Terms 'first', 'second', and 'third' used herein are only for discriminating different components, not limiting the manufacturing order, and may not be the same in the detailed description and claims.

Non-specific, but approximate directions are defined in FIGS. 1 to 6 to describe a frame F for a fishing reel having improved machinability according to the present invention.

In the drawings, a palm-facing first panel 10 and a gear-facing second panel 20 are defined as the outside, a space 30 for a spool S is defined as the inside, and these directions are applied to the description and claims relating to other figures, unless specifically stated.

First, as shown in FIGS. 1 to 6, a fishing reel R having a frame F having improved machinability according to the present invention includes a frame F, a spool S, and a spool handle H (other components relating to common fishing reels such as a drag power adjustment device are not described herein).

In the fishing reel R, a leg for fixing a reel to a fishing rod, that is, a fishing rod mount M is coupled to a first rib 41 of a connecting unit 40 of the frame F, for example, by riveting.

A button L1 of a locking unit L, which prevents the spool from being turned and a fishing line from being loosened due to by a user who applies a pulling force with a fishing rod in his/her hands in order to forcibly restore equipment such as a fishhook stuck to waterweeds or rocks under water or to cut a fishing line.

The frame F for a fishing reel having improved machinability, which is an important part of the present invention, includes the first panel 10, the second panel 20, the spool space 30, and the connecting portion 40 having the first rib 41 that connects the panels with the space therebetween.

For the frame F, an improved machining technique and a frame structure for this technique for a trolling reel or a jigging reel for relatively large fishes as compared with a bait reel are mainly described in the specification and claims.

However, if necessary, post machining with a die casting frame may be used, so the present invention is not limited by a raw material for cutting.

The 'gear-facing' second panel 20 is a part keeping various relay gears for connecting the handle H and the spool and is generally used in this field.

The 'palm-facing' first panel 10 is also generally used in this field because a user operates it with a fishing rod with the first panel 10 of the reel R in his/her hand (in contact with a palm) when fishing.

The first panel 10 may be smaller in area than the second panel 20 when being seen from a side in order to ensure and improve operability, grip, and ease of holding when a user holds the reel frame and performs various actions including fishing.

The connecting unit 40 for maintaining the space 30 for the spool S disposed on a shaft between the first and second panel 10 and 20 fundamentally includes the first rib 41 connecting the first and second panel and combined with the fishing rod mount M.

The first rib 41 has a recession 41a for increasing stability by increasing a contact area with the fishing rod mount M therein and fixing holes 41b for fastening the mount, for example, by riveting.

The first rib is divided into two parts by a cutting hole at the middle portion to reduce the weight.

The connecting unit 40 further includes a second rib 43, or second and third ribs 43 and 45 for reinforcement, which are spaced from the first rib 41.

The first to third ribs are inclined under the fishing rod mount M, with the tops open to ensure a space where the fishing line wound around the spool S is loosened and tightened.

The outer sides that are brought in contact with the user's hand such as the palm and other parts of a human body may be rounded to be as smooth as possible when the frame F is machined, and corners may be chamfered to make the outer sides smooth.

To this end, a metal ingot (bar-shaped ingot) such as aluminum or an aluminum alloy is cut to manufacture a frame and there are lathe processing and milling.

Lathe processing is a type of machining that rotates a workpiece and feeds a cutting tool, so it is suitable for machining the outer side of a workpiece rotated on a chuck in a symmetric circle shape and the cost is relatively low.

On the other hand, milling is a type of machining that rotates and feeds a cutting tool with a workpiece fixed, so it can make straight and rounded shapes, but takes relatively long time and higher cost for machining.

In common fishing reel frames of the related art, there was no problem in using lathe processing to machine the outer corners, that is, to make the outside chamfered portions 13 and 23 of the palm-facing first panel 10 and the gear-facing second panel 20.

However, the inner corners, that is, the inside chamfered portions 11 and 21 of the first and second panels 10 and 20 being in contact with the space 30 cannot be made by lathe processing due to interference of the ribs 41, 43, and 45 of the connecting unit 40 when a workpiece is rotated, so these portions require milling.

To solve this problem, the frame F of the present invention has a structure in which the shapes of the ribs 41, 43, 45 are finally made by a body B and curved ends b formed at both sides of the body and being in contact with a recess (r) and the curved ends b maintain the space 30 by being connected to the inside of the first and second panels.

Accordingly, the inside and outside chamfered portions 11 and 21, 13 and 23 of the first and second panels 10 and 20 are formed to fit the entire shape, that is, a designed shape, by applying lathe processing first on a metal ingot (bar-shaped ingot) and then the outer shapes of the ribs 41, 43, and 45 of the connecting unit are formed (that is, a recess (r) ensuring entrance of the tip of a cutting tool in lathe processing for making the inside chamfered portions 11 and 21 is formed (deeper than outer sides 10s between the inside and outside chamfered portions 11 and 21, 13 and 23), the curved ends (b) at both sides of the body B of the rib are formed, and then the inside chamfered portions 11 and 21 of the first and second panels 10 and 20 are formed with the recess (r) therebetween, thereby forming the entire rounded shape).

Next, the space 30 is formed by a cutting tool for milling which is automatically rotated and fed and then surface of the ribs that are in contact with the space are formed such that the ribs 41, 43, and 45 are separated.

As described above, a workpiece such as a metal ingot (bar-shaped ingot) is fixed on a chuck of a lathe such that a machining rotary shaft is arranged in the installation direction of the spool S and then primary lathe processing is performed to make the entire outer shape including the inside and outside chamfered portions 11 and 21, 13 and 23 of the first and second panels 10 and 20 in a circular shape around the machining rotary shaft by rotating the workpiece and feeding a cutting tool for lathe processing.

Secondary milling is performed on the space 30, the inner sides of the first and second panels 10 and 20 being in contact with the space, and the contact surfaces of the ribs 41, 43, and 45, using a cutting tool for milling that is rotated and feed in a direction crossing or intersecting the machining rotary shaft in the primary lathe processing, thereby completing the frame F of the present invention.

Figure 4:
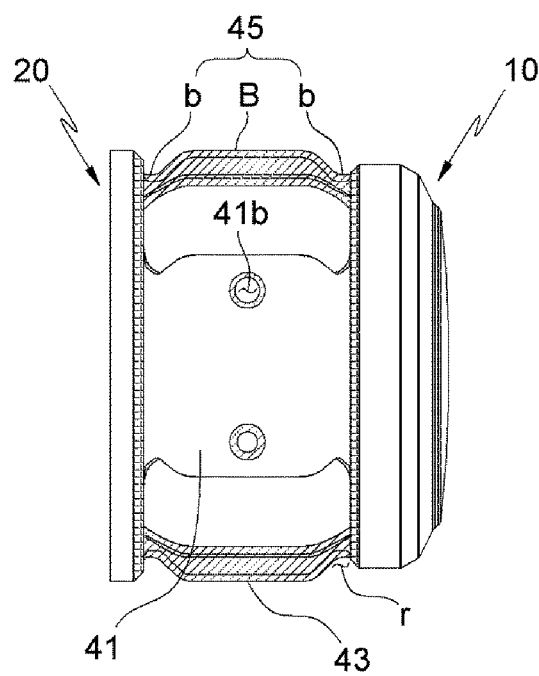
Figure 4:
Figure 5:
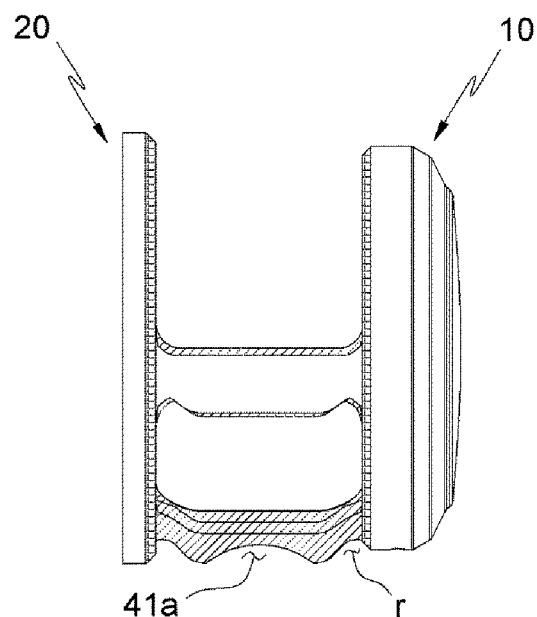
Figure 5:
Figure 6:
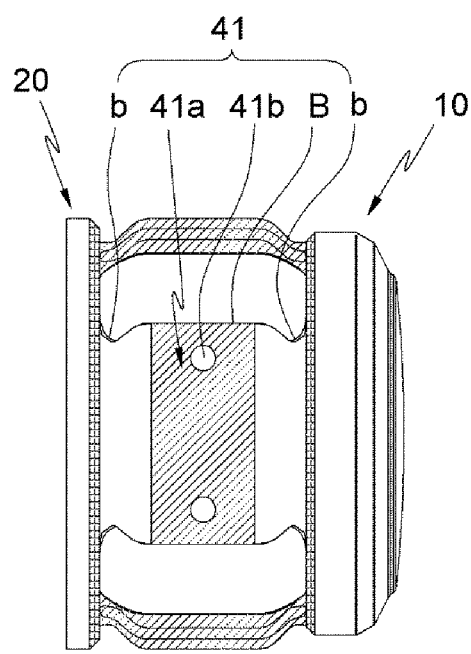
Figure 6:

Referring to FIGS. 4, 5, and 6 showing the frame in various directions, main parts that have undergone lathe processing, that is, the inside chamfered portions 11 and 21, which were necessarily milled in fishing reels of the related art, but were machined by lathe processing in accordance with the present invention are shown by a lattice pattern.

Sides of the first to third ribs 41, 43, and 43 adjacent to the inside chamfered portions, the portions around the recession 41a and the fixing holes 41b of the first rib 41, where milling was applied, are hatched.

Obviously, the surfaces of the first and second panels being in contact with the space 30 (surfaces inside a virtual circle that is in contact with the contact portions of the curved ends (b) and the first and second panels, like the outer sides of the curved ends (b) of the rib, that is, the recess (r) with a workpiece held on a chuck and rotated around the machining rotary shaft in lathe processing) and the inner sides of the ribs are formed by milling, but are not shown for the convenience.

Other than improvement of productivity and reduction of cost by lathe processing of the inside and outside chamfered portions 11 and 21, 13 and 23 of the first and second panels 10 and 20, concentricity is improved and high roundness and excellent surface smoothness can be achieved because circular cutting is performed by rotating a workpiece and feeding and bringing a cutting tool in contact with the workpiece during lathe processing.

On the other hand, in the resultant frame F that has undergone milling, grip and stability in holding of the palm-facing first panel 10 of the fishing reel R are also improved by the curved ends (b) of the ribs, that is, the recess (r).

Although common well-known structures such as a bait reel, a trolling reel, a drag power adjustment device, a braking power adjustment device of a spool were not described above, those skilled in the art would easily estimate and infer the structures.

Further, a fishing reel and a frame having specific shapes and structures were described above with reference to the accompanying drawings to explain the present invention, but the present invention may be changed, modified, and replaced in various ways by those skilled in the art, and those changes, modifications, and replacement should be construed as being in included in the protective range of the present invention.

What is claimed is:

1. A reel frame for fishing, comprising:
   a palm-facing first panel having a disk shape, wherein the palm-facing first panel is composed of a first circumferential surface, a first inner chamfered portion formed along one end of the first circumferential surface, and a first outer chamfered portion formed along the other end of the first circumferential surface;
   a gear-facing second panel having a disk shape, wherein the gear-facing second panel is composed of a second circumferential surface, a second inner chamfered portion formed along one end of the second circumferential surface, and a second outer chamfered portion formed along the other end of the second circumferential surface;
   a spool disposed in a spool space between the palm-facing first panel and the gear-facing second panel; and a connecting unit maintaining the spool space and including a first rib connecting the palm-facing first panel and the gear-facing second panel to each other, and the first rib being capable of being combined with a fishing rod mount, wherein the first rib comprises a body, a first curved end being inwardly curved toward the spool and coupled with a radially inner side of the first inner chamfered portion, and a second curved end being inwardly curved toward the spool and coupled with a radially inner side of the second inner chambered portion to make a recess between the body and the first inner chamfered portion and between the body and the second inner chambered portion, respectively, and wherein the first rib, the palm-facing first panel, and the gear-facing second panel form a monolithic integral single body.

2. The reel frame of claim 1, wherein the connecting unit further includes a second rib for reinforcement that are spaced apart from the first rib, and the first rib, the second rib, the palm-facing first panel, and the gear-facing second panel form a monolithic integral single body.

3. The reel frame of claim 1, wherein the palm-facing first panel is smaller than the gear-facing second panel.

* * * * *